United States Patent [19]
Ballard

[11] Patent Number: 5,693,331
[45] Date of Patent: Dec. 2, 1997

[54] LIQUID BAIT STATION

[75] Inventor: James Bruce Ballard, Medford, N.J.

[73] Assignee: FMC Corporation, Chicago, Ill.

[21] Appl. No.: 621,556

[22] Filed: Mar. 25, 1996

[51] Int. Cl.$^6$ .................................................. A01N 25/32
[52] U.S. Cl. ................................................ 424/405; 424/406
[58] Field of Search ................................. 424/405, 406

[56] References Cited

U.S. PATENT DOCUMENTS

| | | | |
|---|---|---|---|
| 5,501,033 | 3/1996 | Wefler | 43/131 |
| 5,548,922 | 8/1996 | Wefler | 43/131 |

*Primary Examiner*—Thurman K. Page
*Assistant Examiner*—Kathryne E. Shelborne
*Attorney, Agent, or Firm*—Michael B. K. Lee; Douglas W. Rudy; I. Robert Silverman

[57] ABSTRACT

The invention provides a method and apparatus dispensing a liquid bait in a refillable manner. The invention provides a transparent bait station in which is mounted to a structure. A liquid bait is injected into the bait station to initially fill and then refill the bait station. The bait is a slow acting toxicant and attractant. The bait station is formed to allow access by bugs, but not by larger animals. The bait station is also able to protect the bait from wind and rain.

13 Claims, 1 Drawing Sheet

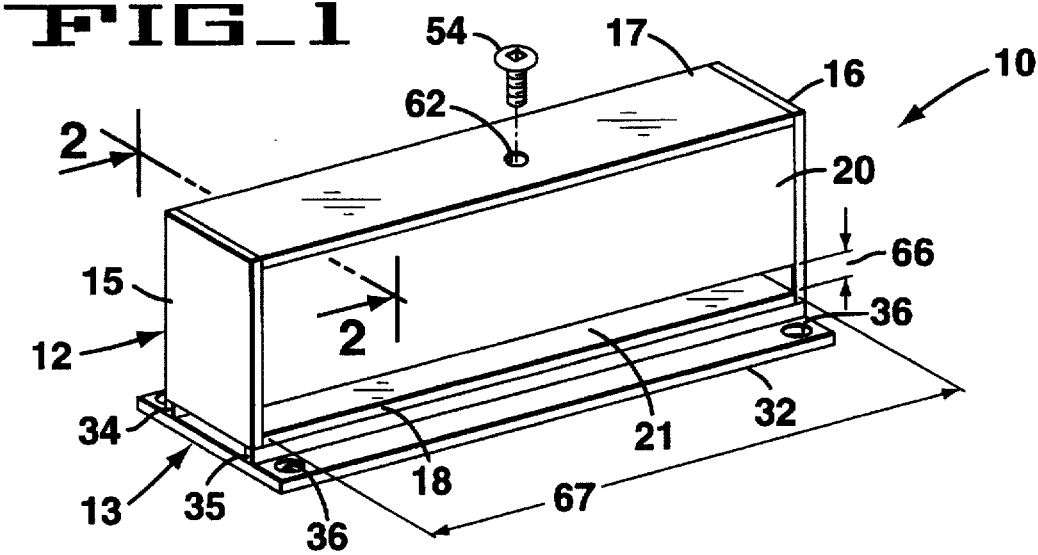
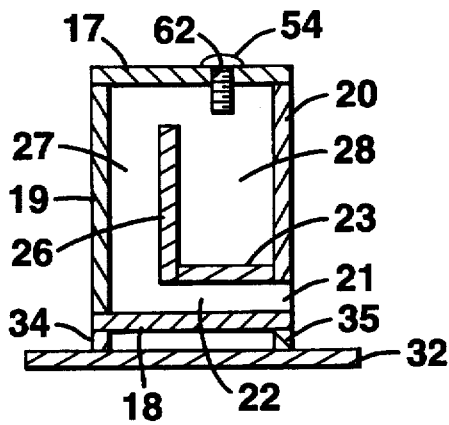
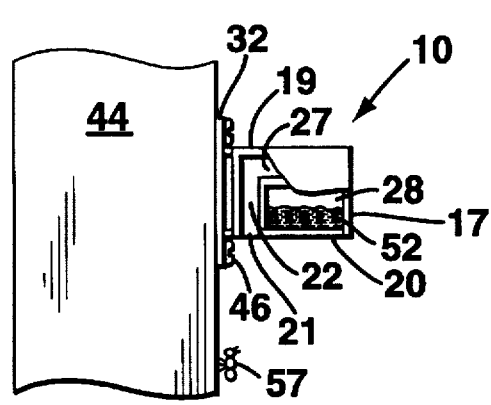
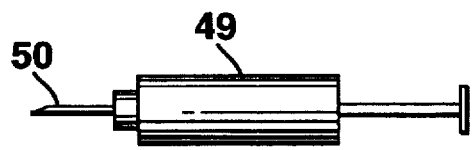
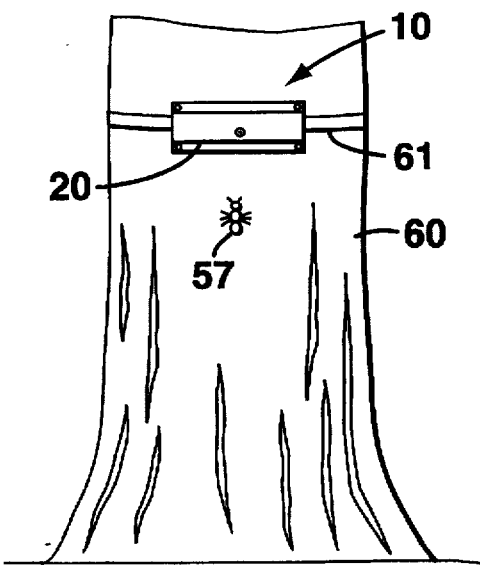
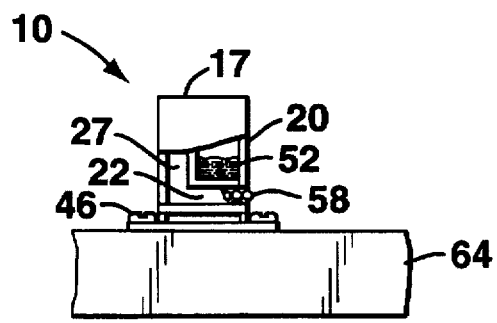

5,693,331

LIQUID BAIT STATION

BACKGROUND OF THE INVENTION

The present invention relates generally to a bait station which is able to hold a liquid bait.

Ants belonging to species of Camponotus, commonly known as carpenter ants, are an important economic pest. They cause structural damage to homes, telephone poles, and trees by tunneling into the wood. Methods to control carpenter ants have been evaluated based on effectiveness against the ants, environmental safety and ease of use, especially for pest control operators (PCO's) concerned with ant population management. Carpenter ants have been controlled in the field by use of sprays or dusts, methods that are considered by many to be environmentally unfriendly. Furthermore, exposure of the spray or dust to environmental elements can limit the effectiveness of the toxicant, for example, by rain washing it away. Spray or dust applications kills ants, but usually does not eliminate a colony, unless the colony is directly sprayed or dusted, which often requires locating the colony. A "cleaner," more effective method of control is to place a toxic bait in an ant station so as to prevent exposure to non-target organisms, such as children and pets, and to shield the bait from environmental factors that may cause degradation and dilution of the toxicant. In addition, baits do not require locating the colony. Typically, when such solid baits have been depleted, the entire self-contained station must be replaced. Preferred toxicants are ones that are slow enough acting to allow the ant time to bring it back to the nest and thereby deliver the toxicant to the rest of the colony. There is a need for such bait stations for carpenter ants.

SUMMARY OF THE INVENTION

It is an object of the invention to provide a refillable bait station for holding a liquid bait.

It is another object of the invention to provide an apparatus and method for eliminating social insects in the ground.

The invention provides a method and apparatus for dispensing a liquid bait in a refillable manner.

BRIEF DESCRIPTION OF THE DRAWINGS

FIG. 1 is a perspective view of a preferred embodiment of the inventive bait station.

FIG. 2 is a cross sectional view of the bait station shown in FIG. 1 along line 2—2.

FIG. 3 is a cut away view of the bait station mounted on a vertical surface of a structure such as a house.

FIG. 4 is a view of a syringe used to inject bait into a bait station.

FIG. 5 is a view of a bait station mounted on a structure such as a tree.

FIG. 6 is a view of a bait station mounted on a horizontal surface of a structure.

DESCRIPTION OF THE PREFERRED EMBODIMENTS

FIG. 1 is a perspective view of a preferred embodiment of the inventive bait station 10. FIG. 2 is a cross sectional view of the bait station 10 shown in FIG. 1 along line 2—2. The bait station 10 comprises a slotted enclosure 12 mechanically connected to a mounting means 13. The enclosure 12 is in the form of a rectangular box with a first end wall 15, a second end wall 16, a first side wall 17, a second side wall 18, a top wall 19, and a bottom wall 20. The first end wall 15 is spaced apart from the second end wall 16. The first side wall 17 and the second side wall and the top wall 19 and the bottom wall 20 each extend from the first end wall 15 to the second end wall 16. The top wall 19 also extends from the first side wall 17 to the second side wall 18. The bottom wall 20 also extends from the first side wall 17 to a slot 21, where the bottom wall 20 forms one side of the slot 21 and the second side wall 18 forms another side of the slot 21 and where the slot 21 extends from the first end wall 15 to the second end wall 16. The second side wall 18 forms one side of a first passageway 22 leading from the slot 21. A first inner wall 23 forms a second side of the first passageway 22, with both the first inner wall 23 and the first passageway 22 extending from the first end wall 15 to the second end wall 16 and wherein the first inner wall 23 is parallel to the second side wall 18. A second inner wall 26 is placed at an end of the first inner wall 23 parallel to the top wall 19, so that a second passageway 27 is formed which extends between the top wall 19, the second inner wall 26, the first end wall 15 and the second end wall 16 and is connected to the first passageway 22. A chamber 28 is formed between the first end wall 15, the second end wall 16, the bottom wall 20, the first inner wall 23 and the second inner wall 26 and which is connected to the second passageway 27. The first end wall 15, second end wall 16, first side wall 17, second side wall 18, top wall 19, bottom wall 20, first inner wall 23, and second inner wall 27 are all made of a transparent plastic. A filling hole 62 passes through the first side wall 17. A sealing screw 54 is provided for sealing the filling hole 62.

In the preferred embodiment, the slot 21 has a width 66 of ⅛ of an inch and a length 67 of 3 inches, which is approximately equal to the length of the bait station 10. It is preferable that the width 66 of the slot 21 be less than ¼ of an inch but greater than 1/32 of an inch. The goal is to have a width that is wide enough to allow access by the target pest, but narrow enough to prevent access by certain non-target animals. The length 67 of the slot 21 may be several times larger than the width to provide a large area of access by the target pest and may have a range of between 1 inch to 10 inches.

The mounting means 13 comprises a plate 32 mounted to the slotted enclosure 12 by a first mounting strip 34 and a second mounting strip 35 mechanically connected by an adhesive between the plate 32 and the slotted enclosure 12. The plate 32 has a plurality of screw holes 36 for mounting the station 10 on the wall of a house or on a tree.

In operation, the bait station 10 is mounted to the wall 44 of a structure such as a house, as illustrated in FIG. 3. Mounting screws 46, passing through the screw holes 36 of the plate 32 (FIG. 1) mechanically connect the bait station 10 to the wall 44. The bait station 10 is positioned so that the bottom wall 20 is vertically the lowest part of the slotted enclosure 12. A liquid bait is placed in a syringe (FIG. 4). The tip 50 of the syringe 49 is placed in the filing hole 62 and the liquid bait is injected into the bait station 10, where the liquid bait 52 has an upper surface. The syringe 49 is removed from the filling hole 62 and the sealing screw 54 is placed in the filling hole 62.

Liquid baits include the range of liquids from a low viscosity liquid to a high viscosity liquid in a colloidal system such as a gel. Such liquid baits have an attractant to entice ants or other insects and a slow acting toxicant to kill the ants or other insects.

An ant 57, such as a carpenter ant, crawls up the wall 44 onto the plate 32, through the slot 21 into the first passageway 22, and then into the second passageway 27, into the chamber 28 to the upper surface of the liquid bait 52. The ant 57 takes some of the liquid bait and returns to the ant colony, where the bait is distributed. The slow acting toxicant kills the ant and several other ants which also feed on the slow acting toxicant in the colony.

The transparent sides of the bait station 10 are used to view the liquid bait. When the liquid bait is diminished, the sealing screw 54 is removed from the filling hole 62 and the syringe 49 is used to inject more liquid bait into the bait station 10.

The bait station 10 protects the liquid bait 52 from exposure to wind and rain. The bait station 10 prevents leakage of the liquid bait 52, which otherwise could expose the toxicants to animals.

FIG. 5 illustrates a bait station 10 mechanically connected to a vertical surface of a structure such as a tree 60 by a plastic strap 61. The plastic strap passes between the plate 32, the first side wall 18, the first mounting strip 34 and the second mounting strip 35 (FIG. 2). The bait station 10 is mounted so that the bottom wall 20 is vertically the lowest part of the slotted enclosure 12.

FIG. 6 illustrates a bait station 10 mounted on a horizontal surface of a structure 64 such as a house. The mounting screws 46 are used to mechanically connect the bait station 10 to the structure 64. An ant 58 is shown partly in the slot 21 (FIG. 2) and partly in the first passage 22. The ant 58 crawls from the first passage 22 to the second passage 27 and to the liquid bait 52. The ant 58 takes the liquid bait 58 to the ant's colony.

As used in the specification and claims means for mechanically connecting the bait station to a structure may be by screws, plastic straps, adhesives, nails or other means.

Other embodiments of the invention may provide a longer station, such as one 9 inches long. The bait stations may be designed for other arthropod pests such as roaches, yellow jackets, earwigs, sow bugs, crickets, silverfish, and firebrats. The walls may be tinted other colors, such as yellow to attract yellow jackets.

While preferred embodiments of the present invention have been shown and described herein, it will be appreciated that various changes and modifications may be made therein without departing from the spirit of the invention as defined by the scope of the appended claims.

What is claimed is:

1. A bait station for dispensing a liquid bait, comprising:

a slotted enclosure and wherein at least part of the slotted enclosure is made of a transparent material;

a first inner wall within the slotted enclosure and forming a first passageway from the slot of the slotted enclosure and a chamber, wherein the first passageway and the chamber are within the slotted enclosure;

a filling hole passing through the enclosure to the chamber;

means for sealing the filling hole; and a means for mounting the slotted enclosure to a structure.

2. The bait station, as claimed in claim 1, wherein the slotted enclosure, comprises:

a first end wall;

a second end wall spaced apart from the first end wall;

a first side wall extending from the first end wall and to the second end wall;

a second side wall extending from the first end wall to the second end wall;

a top wall extending from the first end wall to the second end wall and from the first side wall to the second side wall; and a bottom wall extending from the first end wall to the second end wall and from the first side wall to the slot, wherein the slot extends from the first end wall to the second end wall and from the second side wall to the bottom wall.

3. The apparatus, as claimed in claim 2, wherein the slotted enclosure, further comprises:

a first inner wall extending from the bottom wall adjacent to the slot into the slotted enclosure, and extending from the first end wall to the second end wall;

a second inner wall which extends from the first end wall to the second end wall and is parallel to the top wall.

4. The apparatus, as claimed in claim 2, wherein the means for mounting, comprises:

a plate connected to the slotted enclosure, wherein the plate has a plurality of screw holes; and means for attaching a plastic strap to the plate.

5. The apparatus, as claimed in claim 2, wherein the slot has a width and the width is between $\frac{1}{32}$ of an inch and $\frac{1}{4}$ of an inch.

6. The apparatus, as claimed in claim 5, wherein the slot has a length and the length is between 1 inch and 10 inches.

7. The apparatus, as claimed in claim 2, wherein the slot has a width and the width is $\frac{1}{8}$ of an inch.

8. The apparatus, as claimed in claim 7, wherein the slot has a length and the length is greater than 3 inches.

9. The apparatus, as claimed in claim 7, wherein the slot has a length and the length is between 1 inch and 10 inches.

10. A method for controlling pests around a structure, comprising the steps of:

mechanically connecting a bait station to the structure;

opening a hole in the bait station;

injecting liquid bait comprising a slow acting toxicant and attractant through the hole into the bait station; and closing the hole.

11. The method, as claimed in claim 10,, wherein the step of injecting, comprises the steps of:

placing the liquid bait into a syringe with a tip;

placing the tip of the syringe into the hole; and injecting the liquid bait from the syringe through the hole into the bait station.

12. The method, as claimed in claim 11, further comprising the steps of:

reopening the hole in the bait station;

placing liquid bait into a syringe with a tip;

placing the tip of the syringe into the hole;

injecting the liquid bait from the syringe through the hole into the bait station; and reclosing the hole.

13. The method, as claimed in claim 10, further comprising the steps of:

reopening the hole in the bait station;

injecting liquid bait comprising a slow acting toxicant and attractant through the hole into the bait station; and reclosing the hole.

\* \* \* \* \*